(12) United States Patent
Hayashi et al.

(10) Patent No.: US 10,744,830 B2
(45) Date of Patent: Aug. 18, 2020

(54) VEHICLE

(71) Applicant: YAMAHA HATSUDOKI KABUSHIKI KAISHA, Iwata-shi, Shizuoka (JP)

(72) Inventors: Tomoyuki Hayashi, Shizuoka (JP); Hiroyuki Fujimoto, Shizuoka (JP); Shigeaki Oba, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 182 days.

(21) Appl. No.: 16/027,405

(22) Filed: Jul. 5, 2018

(65) Prior Publication Data

US 2019/0061450 A1    Feb. 28, 2019

(30) Foreign Application Priority Data

Aug. 22, 2017   (JP) ................. 2017-159746

(51) Int. Cl.
| | |
|---|---|
| *B60G 3/18* | (2006.01) |
| *B60K 17/34* | (2006.01) |
| *B60N 2/01* | (2006.01) |
| *B60K 17/06* | (2006.01) |
| *B60K 5/00* | (2006.01) |
| *B60T 1/06* | (2006.01) |
| *B60K 17/22* | (2006.01) |
| *B60T 7/10* | (2006.01) |
| *B60G 3/20* | (2006.01) |

(52) U.S. Cl.
CPC ............. *B60G 3/18* (2013.01); *B60G 3/20* (2013.01); *B60K 5/00* (2013.01); *B60K 17/06* (2013.01); *B60K 17/22* (2013.01); *B60K 17/34* (2013.01); *B60N 2/01* (2013.01); *B60T 1/062* (2013.01); *B60T 1/065* (2013.01); *B60T 7/102* (2013.01); *B60G 2200/144* (2013.01); *B60K 2005/003* (2013.01); *B60Y 2200/20* (2013.01); *B60Y 2400/72* (2013.01)

(58) Field of Classification Search
CPC ........... B60T 1/065; B60T 1/062; B60G 3/18; B60G 3/20; B60K 17/34

See application file for complete search history.

(56) References Cited

U.S. PATENT DOCUMENTS

| | | | |
|---|---|---|---|
| 6,978,857 B2 * | 12/2005 | Korenjak | ............ F16H 63/3416 180/292 |
| 7,367,633 B2 * | 5/2008 | Craig | .................... B60T 13/588 180/370 |
| 7,950,486 B2 | 5/2011 | Van Bronkhorst et al. | |

(Continued)

*Primary Examiner* — Jacob D Knutson
*Assistant Examiner* — Michael R Stabley
(74) *Attorney, Agent, or Firm* — Keating and Bennett, LLP

(57) ABSTRACT

A vehicle includes an engine, a front frame, a rear frame, an intermediate frame, a front propeller shaft, a rear propeller shaft, and a brake. A pair of right and left front lower arms are swingably mounted to the front frame. A pair of right and left rear lower arms are swingably mounted to the rear frame. The intermediate frame is located between the front frame and the rear frame. The front propeller shaft extends forward from the engine and the rear propeller shaft extends rearward from the engine. The brake is located outside the engine in the front-rear direction and within a region defined by the intermediate frame and brakes a rotation of the front propeller shaft.

13 Claims, 9 Drawing Sheets

(56) References Cited

U.S. PATENT DOCUMENTS

| | | | |
|---|---|---|---|
| 8,327,967 B2* | 12/2012 | Schapf | B60K 17/02 180/233 |
| 8,376,907 B2* | 2/2013 | Poulin | B60T 1/062 477/35 |
| 9,551,383 B2* | 1/2017 | Fukuda | B60K 17/35 |
| 2009/0091101 A1* | 4/2009 | Leonard | B60G 3/20 280/638 |
| 2016/0152135 A1* | 6/2016 | Morimoto | B60W 10/06 180/69.4 |

* cited by examiner

VEHICLE

CROSS REFERENCE TO RELATED APPLICATIONS

This application claims the benefit of priority to Japanese Patent Application No. 2017-159746 filed on Aug. 22, 2017. The entire contents of this application are hereby incorporated herein by reference.

BACKGROUND OF THE INVENTION

1. Field of the Invention

The present invention relates to a vehicle that includes an arm that is swingably mounted to a frame of a vehicle body and supports a vehicle wheel.

2. Description of the Related Art

A vehicle described in U.S. Pat. No. 7,950,486 includes a frame, an engine, a front drive line, a front differential, a rear drive line, a rear differential, a front suspension, a rear suspension, and a parking brake. The engine is supported by a central portion of the frame.

The front drive line includes a shaft extending forward from the engine. The front differential is mounted to a front portion of the frame and is linked to the shaft of the front drive line. The rear drive line includes a shaft extending rearward from the engine. The rear differential is mounted to a rear portion of the frame and is linked to the shaft of the rear drive line. A rotational power of the engine is transmitted to right and left front wheels via the front drive line and the front differential. The rotational power of the engine is transmitted to right and left rear wheels via the rear drive line and the rear differential.

The front suspension includes a pair of right and left control arms respectively supporting the right and left front wheels. These control arms are swingably mounted to a front portion of the frame. The rear suspension includes a pair of right and left control arms respectively supporting the right and left rear wheels. These control arms are swingably mounted to a rear portion of the frame. The parking brake is located in the front drive line or the rear drive line.

With the vehicle described in U.S. Pat. No. 7,950,486, it is preferable for right-left lengths of the respective control arms of the front suspension and the rear suspension to be long to secure excellent motion performance when travelling on a rough road such as rough terrain, etc. Lengths from the centers of the swing points of the control arms to the vehicle wheels are thereby long and the vehicle wheels thus undergo up-down movement along an arc of a larger radius. Consequently, changes in right-left direction positions and orientations of the vehicle wheels when the vehicle wheels undergo up-down movement become small, thus securing excellent motion performance. On the other hand, a vehicle width of this type of vehicle is preferably as small as possible to enable passage through locations of narrow width. When the vehicle width is small, it is difficult to make the right-left lengths of the control arms long and when the right-left lengths of the control arms are long, it is difficult to make the vehicle width small. That is, making the vehicle compact and securing long lengths of the control arms conflict with each other.

SUMMARY OF THE INVENTION

In order to overcome the previously unrecognized and unsolved challenges described above, preferred embodiments of the present invention provide vehicles including at least one seat, an engine, a front frame, a rear frame, an intermediate frame, a front propeller shaft, a rear propeller shaft, and a brake. The seats are located such that a plurality of occupants are able to be seated in a right-left direction. A pair of right and left front arms respectively supporting right and left front wheels are swingably mounted to the front frame. A pair of right and left rear arms respectively supporting right and left rear wheels are swingably mounted to the rear frame. The intermediate frame is located between the front frame and the rear frame in a front-rear direction and supports the at least one seat and the engine. The front propeller shaft extends forward from the engine and transmits a rotational power of the engine to the front wheels. The rear propeller shaft extends rearward from the engine and transmits the rotational power of the engine to the rear wheels. The brake is located outside the engine in the front-rear direction and within a region defined by the intermediate frame and brakes a rotation of the front propeller shaft or the rear propeller shaft.

In accordance with a preferred embodiment of the present invention, the brake that brakes the rotation of a propeller shaft is outside the engine in the front-rear direction and located within the region defined by the intermediate frame. An installation space for the brake is thus not required to be provided in the front frame or the rear frame. This enables widths of the front frame and the rear frame to be narrow. Making the vehicle compact at the front frame and the rear frame is thus enabled, and the front arms which are mounted to the front frame and support the front wheels, and the rear arms which are mounted to the rear frame and support the rear wheels are thus able to be long. That is, securing sufficient lengths of the front arms and the rear arms is enabled while making the vehicle compact.

In a preferred embodiment of the present invention, the vehicle further includes a front drive shaft, a rear drive shaft, a front gearing, and a rear gearing. The front drive shaft extends rightward and leftward and is linked to the front wheels. The rear drive shaft extends rightward and leftward and is linked to the rear wheels. The front gearing is supported by the front frame and links the front propeller shaft and the front drive shaft. The rear gearing is supported by the rear frame and links the rear propeller shaft and the rear drive shaft. In this case, the brake is preferably located between the front gearing and the rear gearing.

In accordance with a preferred embodiment of the present invention, the brake is located between the front gearing supported by the front frame and the rear gearing supported by the rear frame. The installation space for the brake that brakes the rotation of the propeller shaft is thus not required to be provided in the front frame or the rear frame. This enables the widths of the front frame and the rear frame to be narrow. The front arms and the rear arms are thus able to be long while making the vehicle compact at the front frame and the rear frame.

In a preferred embodiment of the present invention, the brake is located between rear ends of the front arms and front ends of the rear arms. In accordance with this preferred embodiment, the brake is located between the rear ends of the front arms which are mounted to the front frame, and the front ends of the rear arms which are mounted to the rear frame. The installation space for the brake that brakes the rotation of the propeller shaft is thus not required to be provided in the front frame or the rear frame. This enables the widths of the front frame and the rear frame to be narrow.

The front arms and the rear arms are thus able to be long while making the vehicle compact at the front frame and the rear frame.

In a preferred embodiment of the present invention, the brake is located farther forward or farther rearward than the engine. In accordance with this preferred embodiment, the brake is located in proximity to the engine that is supported by the intermediate frame. The installation space for the brake that brakes the rotation of the propeller shaft is thus not required to be provided in the front frame or the rear frame. This enables the widths of the front frame and the rear frame to be narrow. The front arms and the rear arms are thus able to be long while making the vehicle compact at the front frame and the rear frame.

In a preferred embodiment of the present invention, the intermediate frame is wider than the front frame and the rear frame. This arrangement enables the installation space for the brake that brakes the rotation of the propeller shaft to be secured in the wide intermediate frame. The installation space is thus not required to be provided in the front frame or the rear frame. This enables the widths of the front frame and the rear frame to be narrow. The front arms and the rear arms are thus able to be long while making the vehicle compact at the front frame and the rear frame.

In a preferred embodiment of the present invention, the brake is a parking brake including a disk integrally rotatably linked to the front propeller shaft, and a caliper holding a pad that clamps the disk to generate a braking force. In accordance with this preferred embodiment, the installation space for the parking brake including the bulky disk is not required to be provided in the front frame or the rear frame. This enables the widths of the front frame and the rear frame to be narrow. The front arms and the rear arms are thus able to be long while making the vehicle compact at the front frame and the rear frame.

In a preferred embodiment of the present invention, the vehicle further includes a shiftable transmission that shifts and transmits the rotational power from the engine to the front propeller shaft and the rear propeller shaft and is integral with the engine to define a drive unit. In this case, the brake is preferably located farther forward than the drive unit. In accordance with this preferred embodiment, the brake that brakes the rotation of the propeller shaft is located farther forward than the drive unit that includes the engine supported by the intermediate frame and the shiftable transmission. The installation space for the brake that brakes the rotation of the propeller shaft is thus not required to be provided in the rear frame. This enables the width of the rear frame to be narrow. The rear arms are thus able to be long while making the vehicle compact at the rear frame.

In a preferred embodiment of the present invention, the shiftable transmission is located farther forward than the engine, and the brake is located farther forward than the shiftable transmission. In accordance with this preferred embodiment, the brake that brakes the rotation of the propeller shaft is located farther forward than the shiftable transmission which is farther forward than the engine, which is supported by the intermediate frame. The installation space for the brake that brakes the rotation of the propeller shaft is thus not required to be provided in the rear frame. This enables the width of the rear frame to be narrow. The rear arms are thus able to be long while making the vehicle compact at the rear frame.

In a preferred embodiment of the present invention, the caliper is fixed to the drive unit. In accordance with this preferred embodiment, the brake is able to be located in proximity to the engine which is an element of the drive unit and is supported by the intermediate frame. The installation space for the brake that brakes the rotation of the propeller shaft is thus easily secured in the region defined by the intermediate frame. The installation space is thus not required to be provided in the rear frame. This enables the width of the rear frame to be narrow. The rear arms are thus able to be long while making the vehicle compact at the rear frame.

In a preferred embodiment of the present invention, the drive unit further includes a continuously variable transmission integral with the engine and the shiftable transmission and that transmits the rotational power from the engine to the shiftable transmission. In this case, a mounting width of the pair of rear arms at the rear frame is preferably narrower than a width of the drive unit. In accordance with this preferred embodiment, the rear arms are able to be long while making the vehicle compact at the rear frame in accordance with the narrowing of the mounting width of the pair of rear arms at the rear frame.

In a preferred embodiment of the present invention, the brake is preferably located at a center or substantially a center of the vehicle in the right-left direction of the vehicle.

In a preferred embodiment of the present invention, the at least one seat includes a pair of seats that are aligned in the right-left direction. In this case, it is preferable for at least a portion of the brake to be located in a region between the pair of seats in a plan view of the vehicle.

In a preferred embodiment of the present invention, the front arms and the rear arms are A-arms. The lengths of the A-arms strongly influence the motion performance of the vehicle. If the brake is located in the region defined by the intermediate frame in the front-rear direction as discussed above, the widths of the front frame and the rear frame are able to be small. Securing sufficient lengths of the A-arms mounted to the front frame and the rear frame is thus enabled while making the vehicle compact at the front frame and the rear frame.

In a preferred embodiment of the present invention, the vehicle further includes a pair of vertical frames and an upper frame. The pair of vertical frames extend upward while extending to the right and the left from portions of the rear frame at which the pair of rear arms are mounted. The upper frame is located at a position higher than the rear frame, is linked to upper ends of the pair of vertical frames, and supports a rear deck. In this case, a distance between lower ends of the pair of vertical frames is preferably not more than about one-third of a distance between the upper ends of the pair of vertical frames, for example. In accordance with this preferred embodiment, due to the distance between the lower ends of the pair of vertical frames being not more than about one-third of the distance between the upper ends of the pair of vertical frames, a distance between mounting positions of the pair of rear arms is small. Accordingly, the rear arms are able to be long while making the vehicle compact at the rear frame.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

In the preferred embodiments of the present invention described below, front-rear, right-left, and up-down are directions defined based on a viewpoint of a driver sitting on a seat of a vehicle and facing a steering wheel. The right-left direction is a vehicle width direction of the vehicle. Also, the description shall be provided based on a state where the vehicle is on a horizontal plane.

Figure 1:
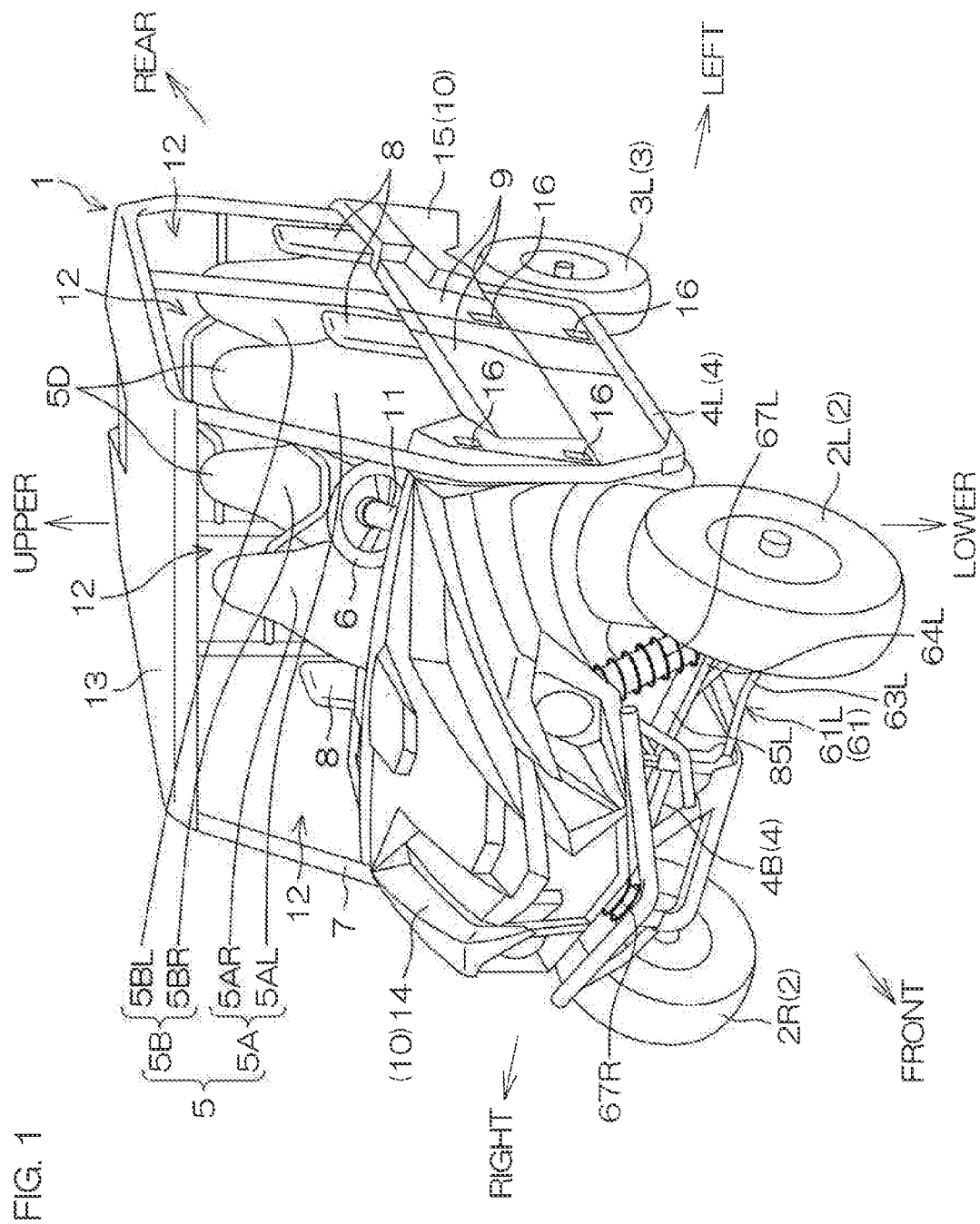
FIG. 1 is a schematic perspective view of a vehicle according to a preferred embodiment of the present invention.

FIG. 1 is a schematic perspective view of the vehicle 1 according to a preferred embodiment of the present invention. The vehicle 1 is preferably a utility vehicle and more specifically is preferably a four-wheel drive, all-terrain vehicle that is called a recreational off-road vehicle and travels through forests, deserts, etc.

The vehicle 1 includes a pair of right and left front wheels 2, a pair of right and left rear wheels 3, a frame 4, at least one seat 5, a steering wheel 6, a roll cage 7, bolsters 8, doors 9, and a body panel 10.

The pair of right and left front wheels 2 include a right front wheel 2R and a left front wheel 2L that are aligned in the right-left direction. The pair of right and left rear wheels 3 include a right rear wheel 3R and a left rear wheel 3L that are aligned in the right-left direction and located farther rearward than the front wheels 2. Each of the left front wheel 2L, right front wheel 2R, left rear wheel 3L, and right rear wheel 3R includes a tire. Recesses and projections in a block pattern to travel on rough terrain may be provided on a surface of each tire. A wheelbase of the vehicle 1 is preferably short and the vehicle width is narrow in order to travel with good maneuverability even in narrow locations such as between trees, etc.

The frame 4 defines a vehicle body of the vehicle 1. The frame 4 is supported by the pair of right and left front wheels 2 and the pair of right and left rear wheels 3. The frame 4 is preferably made of a metal, such as iron or aluminum, etc., and includes an intermediate frame 4A, a left frame 4L, a right frame 4R, a front frame 4B, a rear frame 4C, and an upper frame 4D (see FIG. 2 described below). The left frame 4L is provided at the left of the intermediate frame 4A. The right frame 4R is provided at the right of the intermediate frame 4A. The front frame 4B is provided in front of the intermediate frame 4A. The rear frame 4C is provided at the rear of the intermediate frame 4A. The upper frame 4D is provided above the rear frame 4C.

The vehicle 1 of the present preferred embodiment preferably seats four people, for example. Accordingly, the seats 5 include a pair of right and left front seats 5A and a pair of right and left rear seats 5B. The front seats 5A and the rear seats 5B are respectively located such that a plurality of occupants are seated alongside each other in the right-left direction. The pair of right and left front seats 5A include a right front seat 5AR and a left front seat 5AL that are aligned in the right-left direction. The pair of right and left rear seats 5B include a right rear seat 5BR and a left rear seat 5BL that are aligned in the right-left direction and located farther rearward than the front seats 5A. One of the front seats 5A, for example, the left front seat 5AL is a driver's seat on which the driver sits while facing forward. Each of the seats 5 includes a seat portion 5C and a backrest 5D rising from a rear end of the seat portion 5C, and an upper surface of the seat portion 5C is a seat surface 5E of the seat 5 (see FIG. 3 described below). The seat surface 5E may be a horizontal or substantially horizontal flat surface or may be a downwardly recessed, concave, curved surface. The seat surfaces 5E of the left front seat 5AL and the right front seat 5AR are mutually at the same or substantially the same height position. The seat surfaces 5E of the left rear seat 5BL and the right rear seat 5BR are mutually at the same or substantially the same height position. The seat surfaces 5E of the front seats 5A and the seat surfaces 5E of the rear seats 5B may be at the same or substantially the same height position.

The steering wheel 6 is located in front of the left front seat 5AL. A steering shaft 11 is mounted so as to be rotatable around its axis to the frame 4. The steering wheel 6 is coupled to a rear end of the steering shaft 11.

The roll cage 7 is mounted to the frame 4 and surrounds the pair of front seats 5A and the rear seats 5B. The roll cage 7 defines openings 12, one each at the left of the left front seat 5AL, the right of the right front seat 5AR, the left of the left rear seat 5BL, and the right of the right rear seat 5BR, for boarding and exiting of the occupants. A roof 13 is coupled to an upper portion of the roll cage 7.

The bolsters 8 are plate members made of, for example, resin and one each is provided adjacent to the left of the left front seat 5AL, adjacent to the right of the right front seat 5AR, adjacent to the left of the left rear seat 5BL, and adjacent to the right of the right rear seat 5BR. Each bolster 8 faces the occupant seated on the corresponding seat 5 from the outer side in the right-left direction and helps contain the occupant.

The doors 9 are provided one each at each opening 12, are mounted to the frame 4 via hinges 16, and are able to open and close by swinging around vertical axes. Each of the doors 9 in FIG. 1 is at a closed position and closes a lower region of an opening 12. When an occupant swings a door 9 outward, the door 9 is located at an open position and opens the lower region of an opening 12.

The body panel 10 is made, for example, of resin and is mounted to the frame 4. The body panel 10 includes a front panel 14 covering a front portion of the vehicle 1 farther forward than the front seats 5A, and a rear panel 15 covering a rear portion of the vehicle 1 farther rearward than the rear seats 5B. The doors 9 may define a portion of the body panel 10.

Figure 2:
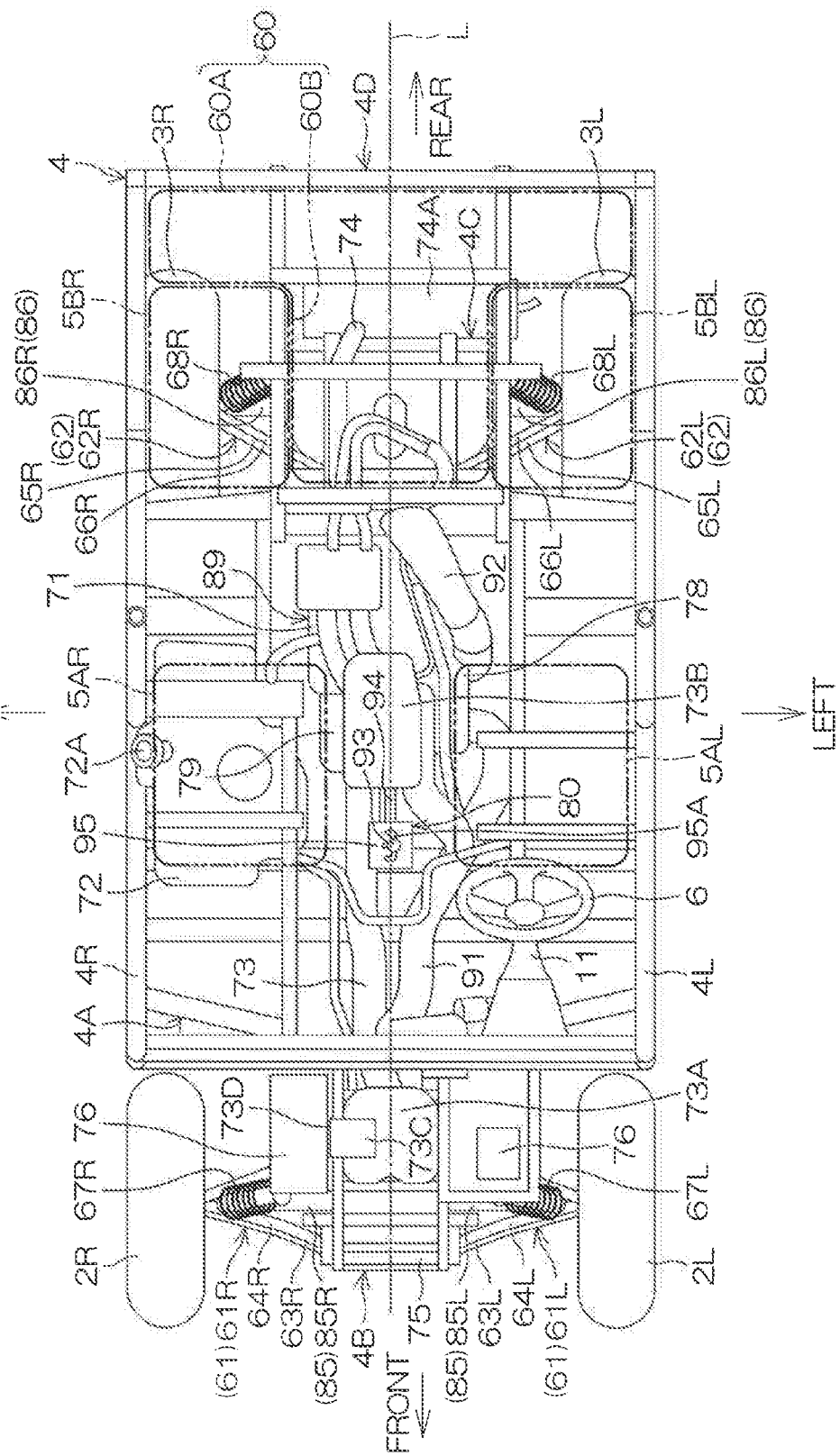
FIG. 2 is a schematic plan view of a vehicle in a state where a roof and a body panel, etc., are removed.

FIG. 2 is a schematic plan view of the vehicle 1 in a state where the roll cage 7, the doors 9, the body panel 10, and the roof 13 are removed.

The vehicle 1 includes a rear deck 60. The rear deck 60 includes a laterally elongated portion 60A located farther rearward than the rear seat 5B, and a projection 60B projecting forward from a center of the laterally elongated portion 60A and located between the left rear seat 5BL and the right rear seat 5BR, and is T-shaped or substantially T-shaped in plan view.

The vehicle 1 includes a pair of right and left front suspensions 61 suspending the pair of right and left front wheels 2 respectively, and a pair of right and left rear suspensions 62 suspending the pair of right and left rear wheels 3 respectively. The pair of right and left front suspensions 61 include a front suspension 61R suspending the right front wheel 2R, and a front suspension 61L suspending the left front wheel 2L. The pair of right and left rear suspensions 62 include a rear suspension 62R suspending the right rear wheel 3R, and a rear suspension 62L suspending the left rear wheel 3L. The frame 4 is supported by the pair of front wheels 2 and the pair of rear wheels 3 via the suspensions 61L, 61R, 62L, and 62R. The suspensions 61L, 61R, 62L, and 62R in the present preferred embodiment are preferably of the double wishbone type.

The front suspension 61L includes a front upper arm 64L and a front lower arm 63L aligned in the up-down direction. The front suspension 61R includes a front upper arm 64R and a front lower arm 63R aligned in the up-down direction. The right and left pair of front lower arms 63R and 63L are an example of front arms according to a preferred embodiment of the present invention. Each of the front lower arms 63L and 63R and the front upper arms 64L and 64R is preferably an A-arm.

A left end of each of the front lower arm 63L and the front upper arm 64L is coupled to a knuckle arm (not shown) of the front wheel 2L. A right end of each of the front lower arm 63R and the front upper arm 64R is coupled to a knuckle arm (not shown) of the front wheel 2R. The front lower arms 63R and 63L and the front upper arms 64R and 64L support the right and left front wheels 2R and 2L. A right end of each of the front lower arm 63L and the front upper arm 64L is mounted to the front frame 4B so as to be swingable up and down. A left end of each of the front lower arm 63R and the front upper arm 64R is mounted to the front frame 4B so as to be swingable up and down.

A lower end of a shock absorber 67L is coupled to a left end portion of the front upper arm 64L, and a lower end of a shock absorber 67R is coupled to a right end portion of the front upper arm 64R. Upper ends of the shock absorbers 67L and 67R are coupled to the front frame 4B.

The rear suspension 62L includes a rear upper arm 66L and a rear lower arm 65L aligned in the up-down direction. The rear suspension 62R includes a rear upper arm 66R and a rear lower arm 65R aligned in the up-down direction. The right and left pair of rear lower arms 65R and 65L are an example of rear arms according to a preferred embodiment of the present invention. Each of the rear lower arms 65L and 65R and the rear upper arms 66L and 66R is preferably an A-arm.

A left end of each of the rear lower arm 65L and the rear upper arm 66L is coupled to a knuckle arm (not shown) of the rear wheel 3L. A right end of each of the rear lower arm 65R and the rear upper arm 66R is coupled to a knuckle arm (not shown) of the rear wheel 3R. The rear lower arms 65R and 65L and the rear upper arms 66R and 66L support the right and left rear wheels 3R and 3L. A right end of the rear lower arm 65L is mounted to the rear frame 4C so as to be swingable up and down. A right end of the rear upper arm 66L is mounted to the frame 4 so as to be swingable up and down. A left end of the rear lower arm 65R is mounted to the rear frame 4C so as to be swingable up and down. A left end of the rear upper arm 66R is mounted to the frame 4 so as to be swingable up and down.

A lower end of a shock absorber 68L is coupled to a left end portion of the rear upper arm 66L, and a lower end of a shock absorber 68R is coupled to a right end portion of the rear upper arm 66R. Upper ends of the shock absorbers 68L and 68R are coupled to the upper frame 4D.

Figure 3:
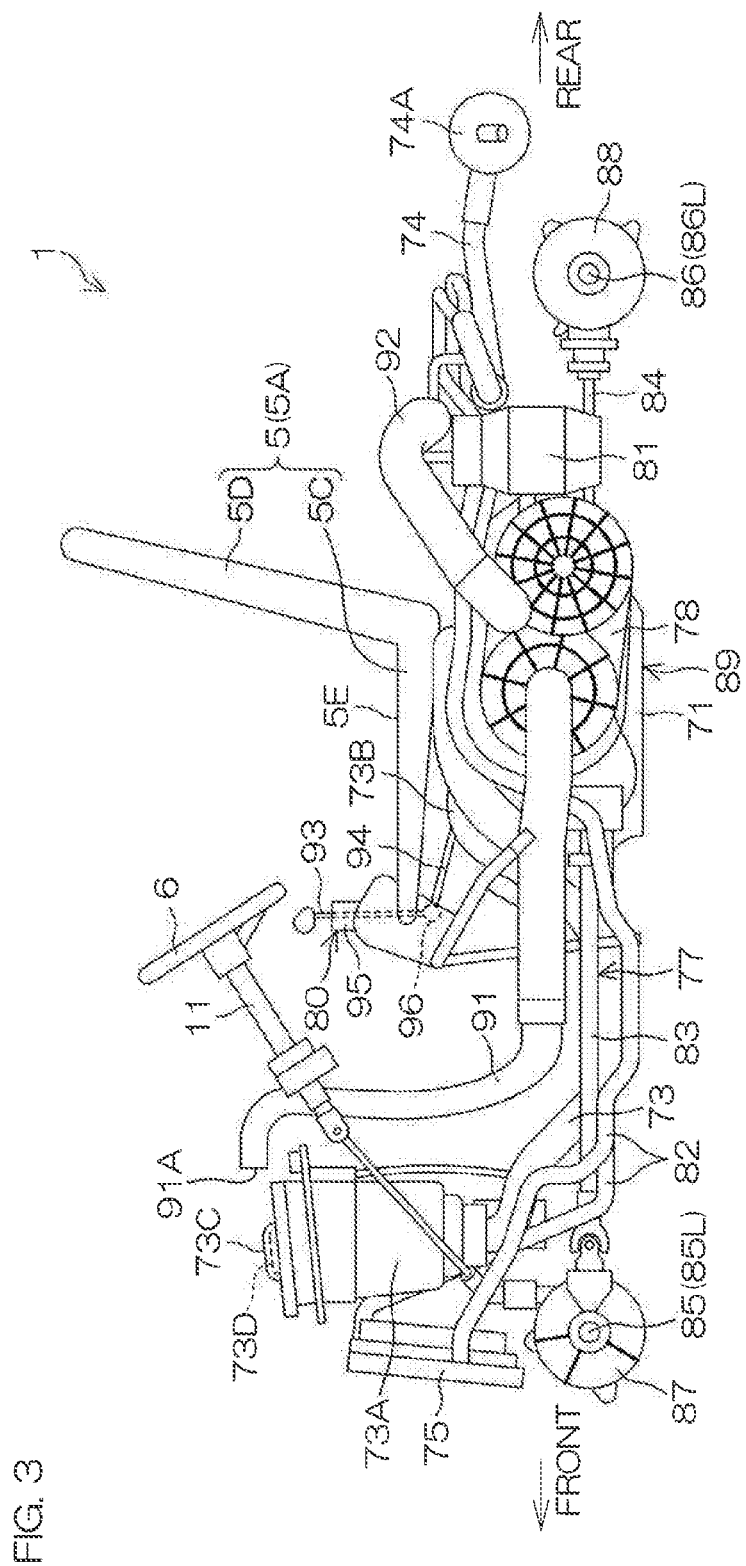
FIG. 3 is a schematic side view of the vehicle in a state where the roof, the body panel, and frames, etc., are removed.

FIG. 3 is a schematic left side view of the vehicle 1 in a state where the frame 4, the roll cage 7, the doors 9, the body panel 10, the roof 13, etc., are removed. Referring to FIG. 2 and FIG. 3, the vehicle 1 includes an engine 71, a fuel tank 72, an intake passage 73, an exhaust passage 74, a radiator 75, batteries 76, a transmission 77, a continuously variable transmission 78, a shiftable transmission 79, and a shifter 80.

The engine 71 is preferably an internal combustion engine and is, for example, a water-cooled, four-cycle, parallel two-cylinder engine in the present preferred embodiment. The engine 71 is coupled to and supported by the intermediate frame 4A. The engine 71 is located at a center of the vehicle 1 in regard to the right-left direction. Specifically, at least a portion of the engine 71 overlaps with a virtual centerline L passing through the center of the vehicle 1 and extending in the front-rear direction in plan view. At least a front end portion of the engine 71 is located between the two front seats 5A in plan view. The engine 71 is located at a position lower than the seat surfaces 5E of the respective front seats 5A. The engine 71 is, for example, a dry-sump engine, and an oil tank 81 that stores engine oil for the engine 71 is located to the rear of the engine 71.

The fuel tank 72 stores fuel for the engine 71. The fuel for the engine 71 is, for example, gasoline. The fuel tank 72 is located to the right of the engine 71 so as to be aligned with the engine 71 in the right-left direction and is coupled to the intermediate frame 4A. The fuel tank 72 is located at a position lower than the seat surfaces 5E of the respective seats 5A and at least a portion of the fuel tank 72 overlaps with the right front seat 5AR in plan view. A fuel inlet (not shown) and a fuel cap 72A that opens and closes the fuel inlet are provided at a right end portion of an upper surface of the fuel tank 72.

The intake passage 73 extends in the front-rear direction at a position lower than the feet of the occupants seated on the front seats 5. An intake box 73A is provided at a front end portion of the intake passage 73 and an accumulator 73B is provided at a rear end portion of the intake passage 73. The intake box 73A is coupled to the front frame 4B. A projection 73C projects upward from an upper surface of the intake box 73A. An air inlet 73D that takes air into the intake box 73A is provided, for example, in a right surface of the projection 73C. The accumulator 73B is located in front of the engine 71 and is connected to intake ports (not shown) at the respective cylinders of the engine 71 via a throttle body (not shown). Air at a periphery of the intake box 73A is taken into the intake box 73A from the air inlet 73D. The air taken into the intake box 73A is cleaned by passing through a filter (not shown) inside the intake box 73A. The cleaned air continues to flow inside the intake passage 73, arrives at the accumulator 73B, and is supplied to the intake ports at the respective cylinders of the engine 71 via the throttle body.

The exhaust passage 74 extends rearward from exhaust ports (not shown) at the respective cylinders of the engine 71. A muffler 74A is provided at a rear end portion of the exhaust passage 74. The muffler 74A is fixed to the rear frame 4C. Exhaust gas generated in the engine 71 flows through the exhaust passage 74 and is discharged from the muffler 74A.

The radiator 75 is located farther forward than the intake box 73A and is coupled to the front frame 4B. The radiator 75 and the engine 71 are linked via a cooling pipe 82. Cooling water flows through the cooling pipe 82 and is thus circulated between the radiator 75 and the engine 71. The circulated cooling water is cooled when flowing through the radiator 75 and cools the engine 71 when flowing through the engine 71.

The batteries 76 supply electric power to electrical elements (not shown) in the vehicle 1. The batteries 76 are provided, for example, one each at the right and the left of the intake box 73A and are fixed to the front frame 4B.

The transmission 77 includes a front propeller shaft 83, a rear propeller shaft 84, front drive shafts 85, rear drive shafts 86, a front gearing 87, and a rear gearing 88. The front propeller shaft 83 extends forward from the engine 71, and the rear propeller shaft 84 extends rearward from the engine 71. A pair of right and left front drive shafts 85 extend rightward and leftward. Of the pair of front drive shafts 85, a left end of the front drive shaft 85L at the left is linked to the left front wheel 2L and a right end of the front drive shaft 85R at the right is linked to the right front wheel 2R. Similarly, a pair of right and left rear drive shafts 86 extend rightward and leftward. Of the pair of rear drive shafts 86, a left end of the rear drive shaft 86L at the left is linked to the left rear wheel 3L and a right end of the rear drive shaft 86R at the right is linked to the right rear wheel 3R.

The front gearing 87 is coupled to the front frame 4B. The front gearing 87 is supported by the front frame 4B. The front gearing 87 links each of a right end of the front drive shaft 85L and a left end of the front drive shaft 85R to a front end of the front propeller shaft 83. The rear gearing 88 is coupled to the rear frame 4C. The rear gearing 88 is supported by the rear frame 4C. The rear gearing 88 links each of a right end of the rear drive shaft 86L and a left end of the rear drive shaft 86R to a rear end of the rear propeller shaft 84.

The continuously variable transmission 78 is preferably a belt transmission in the present preferred embodiment and is located to a side, and more specifically at the left of the engine 71. The fuel tank 72 located to the right of the engine 71 sandwiches the engine 71 with the continuously variable transmission 78. The shiftable transmission 79 is preferably a gear transmission and is located farther forward than the engine 71. The shiftable transmission 79 is shiftable, for example, to any of three shift stages of high speed, low speed, and reverse. The engine 71, the continuously variable transmission 78, and the shiftable transmission 79 are integral and define a drive unit 89.

An intake duct 91 and an exhaust duct 92 are connected to the continuously variable transmission 78. The intake duct 91 extends in the front-rear direction at a position lower than the feet of the occupants seated on the front seats 5. A front portion of the intake duct 91 is bent upward and a front end portion of the intake duct 91 is bent and extends forward. An air inlet 91A that takes air into the intake duct 91 is provided at a front end of the intake duct 91. The air inlet 91A is at the same or substantially the same height position as the air inlet 73D of the intake box 71A. A rear end portion of the intake duct 91 branches in two and is connected to the continuously variable transmission 78. The exhaust duct 92 extends, for example, rearward and upward from the continuously variable transmission 78. Air taken into the intake duct 91 from the air inlet 91A is guided into the continuously variable transmission 78 by the intake duct 91 and cools an interior of the continuously variable transmission 78. The air inside the continuously variable transmission 78 is discharged through the exhaust duct 92.

The shifter 80 includes an operation lever 93 extending in the up-down direction, a shift rod 94 extending in the forward-rearward direction, and a shift gate 95 holding the operation lever 93. The operation lever 93 is inserted in a groove 95A in the shift gate 95 and is movable forward and rearward along the groove 95A. A lower end of the operation lever 93 and a front end of the shift rod 94 are mutually coupled by a ball joint 96 (see FIG. 3). A rear end of the shift rod 94 is coupled to the shiftable transmission 79. The shift gate 95 is fixed to the intermediate frame 4A. When the driver seated on the left front seat 5AL grips an upper end portion of the operation lever 93 and moves it forward or rearward, a shifting operation force by the driver is input into the shiftable transmission 79 and the shiftable transmission 79 is shifted.

A rotational power of the engine 71 is continuously shifted by the continuously variable transmission 78 and then transmitted to the shiftable transmission 79. The rotational power transmitted to the shiftable transmission 79 is shifted at a shift ratio of a shift stage among high speed, low speed, and reverse by the shiftable transmission 79 and then transmitted to the front propeller shaft 83 and the rear propeller shaft 84. The rotational power transmitted to the front propeller shaft 83 is transmitted to the front gearing 87. The front gearing 87 transmits the rotational power to the front drive shafts 85L and 85R. The rotational power is thus transmitted to the right and left front wheels 2. The rotational power transmitted to the rear propeller shaft 84 is transmitted to the rear gearing 88. The rear gearing 88 transmits the rotational power to the rear drive shafts 86L and 86R. The rotational power is thus transmitted to the right and left rear wheels 3. The front gearing 87 of the present preferred embodiment includes a differential gear and transmits the rotational power from the front propeller shaft 83 to the front drive shafts 85L and 85R while allowing a rotational difference between the front drive shafts 85L and 85R. The rear gearing 88 may or may not include a differential gear.

Figure 4:
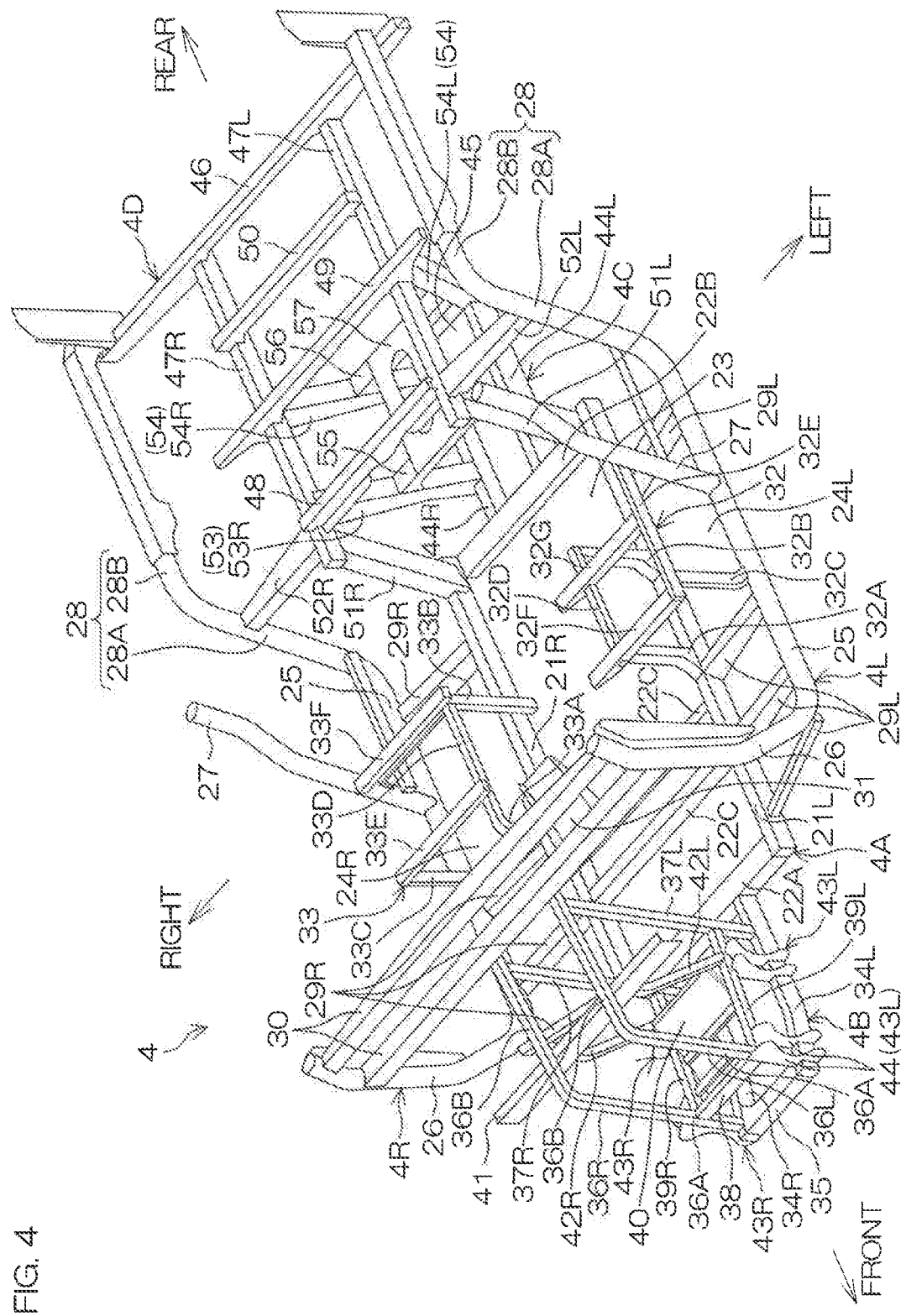
FIG. 4 is a schematic perspective view of the frame included in the vehicle.

FIG. 4 is a schematic perspective view of the frame 4. The above-described intermediate frame 4A, left frame 4L, right frame 4R, front frame 4B, rear frame 4C, and upper frame 4D shall now be described in detail.

The intermediate frame 4A is located between the front frame 4B and the rear frame 4C in regard to the front-rear direction. The intermediate frame 4A includes a left side frame portion 21L, a right side frame portion 21R, a front cross member 22A, a rear cross member 22B, a central plate frame portion 23, a left plate frame portion 24L, and a right plate frame portion 24R. The left side frame portion 21L and the right side frame portion 21R are parallel or substantially parallel to each other and extend in the front-rear direction. The front cross member 22A extends in the right-left direction and links front ends of the right side frame portion 21R and the left side frame portion 21L to each other. The rear cross member 22B extends in the right-left direction and links rear ends of the right side frame portion 21R and the left side frame portion 21L to each other. The frame 4 may include one or more cross members 22C that extend in the right-left direction between the front cross member 22A and the rear cross member 22B and link intermediate portions of the right side frame portion 21R and the left side frame portion 21L to each other.

The central plate frame portion 23 extends, along or substantially along a horizontal plane, between the left side frame portion 21L and the right side frame portion 21R. The left side frame portion 21L and the right side frame portion 21R are linked to each other by the central plate frame portion 23. The left plate frame portion 24L is slightly inclined with respect to a horizontal direction so as to extend leftward and upward from the left side frame portion 21L. The right plate frame portion 24R is slightly inclined with respect to a horizontal direction so as to extend rightward and upward from the right side frame portion 21R.

The left frame 4L extends to an outer side (the left side) of the left side frame portion 21L and is located at a higher position than the central plate frame portion 23. The right frame 4R extends to an outer side (the right side) of the right side frame portion 21R and is located at a higher position than the central plate frame portion 23. The left frame 4L and the right frame 4R are parallel or substantially parallel to each other and face each other in the right-left direction. Each of the left frame 4L and the right frame 4R includes a lateral frame portion 25, a first vertical frame portion 26, a second vertical frame portion 27, and an extension frame portion 28.

The lateral frame portions 25 extend linearly in the front-rear direction. The left side frame portion 21L and the lateral frame portion 25 of the left frame 4L are linked to each other by the left plate frame portion 24L. The right side frame portion 21R and the lateral frame portion 25 of the right frame 4R are linked to each other by the right plate frame portion 24R. The frame 4 may include one or more cross members 29L that extend in the right-left direction and link the left side frame portion 21L and the lateral frame portion 25 of the left frame 4L. The frame 4 may include one or more cross members 29R that extend in the right-left direction and link the right side frame portion 21R and the lateral frame portion 25 of the right frame 4R.

The first vertical frame portions 26 extend upward from front ends of the lateral frame portions 25. Upper end portions of the respective first vertical frame portions 26 of the right frame 4R and the left frame 4L are linked to each other by cylindrical cross members 30 extending in the right-left direction. Each cross member 30 is an example of a cylindrical frame according to a preferred embodiment of the present invention. The frame 4 may include a plurality of cross members 30 and two cross members 30 are juxtaposed in the up-down direction in the present preferred embodiment. A lateral cross-sectional shape of each cross member 30 may be circular or polygonal (for example, rectangular). The frame 4 includes a steering support 31 projecting rearward from a left portion of the lower cross member 30. The steering shaft 11 is coupled to the steering support 31. The second vertical frame portions 27 extend upward from intermediate portions of the lateral frame portions 25. Each extension frame portion 28 includes a vertical portion 28A, extending at an incline upward and rearward from a rear end of a lateral frame portion 25, and a lateral portion 28B, extending horizontally or substantially horizontally rearward from an upper end of the vertical portion 28A. Upper ends of the first vertical frame portions 26, upper ends of the second vertical frame portions 27, and rear ends of the lateral portions 28B of the extension frame portions 28 are coupled to the roll cage 7. The left frame 4L and the right frame 4R may be portions of the roll cage 7.

The intermediate frame 4A includes a left front seat support 32 that supports the left front seat 5AL, and a right front seat support 33 that supports the right front seat 5AR. The left front seat support 32 includes vertical supporting frame portions 32A, 32B, and 32C and horizontal supporting frame portions 32D, 32E, 32F, and 32G. The vertical supporting frame portions 32A and 32B are aligned in the front-rear directions and extend upward from the left side frame portion 21L. The vertical supporting frame portion 32C extends upward from the lateral frame portion 25 of the left frame 4L. The horizontal supporting frame portion 32D extends in the front-rear direction and links upper ends of the vertical supporting frame portions 32A and 32B to each other. The horizontal supporting frame portion 32E extends horizontally or substantially horizontally rearward from an upper end of the vertical supporting frame portion 32C and is connected to the second vertical frame portion 27 of the left frame 4L. The horizontal supporting frame portions 32F and 32G extend in the right-left direction and are aligned in the front-rear direction. Each of the horizontal supporting frame portions 32F and 32G link the horizontal supporting frame portions 32D and 32E to each other. The left front seat 5AL is coupled to the horizontal supporting frame portions 32D, 32F, and 32G of the left front seat support 32.

The right front seat support 33 includes vertical supporting frame portions 33A, 33B, and 33C and horizontal supporting frame portions 33D, 33E, and 33F. The vertical supporting frame portions 33A and 33B are aligned in the front-rear directions and extend upward from the right side frame portion 21R (more specifically, from the central plate frame portion 23 in a vicinity of the right side frame portion 21R). The vertical supporting frame portion 33C extends upward from the lateral frame portion 25 of the right frame 4R. The horizontal supporting frame portion 33D extends in the front-rear direction and link upper ends of the vertical supporting frame portions 33A and 33B to each other. The horizontal supporting frame portion 33E extends rightward from the horizontal supporting frame portion 33D and is connected to an upper end of the vertical supporting frame portion 33C. The horizontal supporting frame portion 33F extends rightward from the upper end of the vertical supporting frame portion 33B and is connected to the second vertical frame portion 27 of the right frame 4R. The right front seat 5AR is coupled to the horizontal supporting frame portions 33D, 33E, and 33F of the right front seat support 33.

The front frame 4B includes a pair of right and left side frame portions 34R and 34L extending forward from the front cross member 22A of the intermediate frame 4A. Front ends of the side frame portions 34R and 34L are linked to each other by a cross member 35 extending in the right-left direction. The front frame 4B includes a pair of supporting frame portions 36L and 36R and a pair of supporting frame portions 37L and 37R.

The supporting frame portion 36L rises upward from a front end portion of the side frame portion 34L and thereafter bends and extends rearward. The supporting frame portion 36R rises upward from a front end portion of the side frame portion 34R and thereafter bends and extends rearward. That is, each of the supporting frame portion 36L and the supporting frame portion 36R includes a vertical portion 36A, extending upward from a front end portion of the side frame portion 34L or 34R, and a lateral portion 36B, extending rearward from an upper end of the vertical portion 36A. A rear end of the lateral portion 36B of each of the supporting frame portion 36L and the supporting frame portion 36R is connected to the lower cross member 30 of the two cross members 30. The supporting frame portion 37L rises upward from a rear end portion of the side frame portion 34L and is connected to a rear end portion of the lateral portion 36B of the supporting frame portion 36L. The supporting frame portion 37R rises upward from a rear end portion of the side frame portion 34R and is connected to a rear end portion of the lateral portion 36B of the supporting frame portion 36R. The intake box 73A is located between the supporting frame portion 36L and the supporting frame portion 36R in the front frame 4B and is coupled to the front frame 4B.

The vertical portions 36A of the supporting frame portions 36R and 36L are linked to each other by a cross member 38 extending in the right-left direction. The vertical portion 36A of the supporting frame portion 36L and the supporting frame portion 37L are linked by a cross member 39L extending in the front-rear direction. The vertical portion 36A of the supporting frame portion 36R and the supporting frame portion 37R are linked by a cross member 39R extending in the front-rear direction. The cross members 39L and 39R are linked by a plate member 40 that is slightly inclined with respect to the horizontal direction so as to extend rearward and upward. The front gearing 87 (see FIG. 3) coupled to the front frame 4B is located below the plate member 40.

The lateral portions 36B of the supporting frame portions 36R and 36L are linked to each other by a cross member 41 extending in the right-left direction. A left end portion of the cross member 41 projects farther leftward than the supporting frame portion 36L and a right end portion of the cross member 41 projects farther rightward than the supporting frame portion 36R. The upper ends of the above-described shock absorbers 67L and 67R are coupled respectively to the left end portion and the right end portion of the cross member 41. The cross members 39L and 41 are linked to each other by a vertical frame portion 42L that rises from a rear end portion of the cross member 39L. The cross members 39R and 41 are linked to each other by a vertical frame portion 42R that rises from a rear end portion of the cross member 39R.

The front frame 4B includes suspension supports 43L and 43R. A pair of front and rear suspension supports 43L are provided. The front suspension support 43L is provided at a lower end portion of the vertical portion 36A of the supporting frame portion 36L. The rear suspension support 43L links the respective rear end portions of the side frame portion 34L and the cross member 39L to each other. Similarly, a pair of front and rear suspension supports 43R are provided. The front suspension support 43R is provided at a lower end portion of the vertical portion 36A of the supporting frame portion 36R. The rear suspension support 43R links the respective rear end portions of the side frame portion 34R and the cross member 39R to each other. Each of the suspension supports 43L and 43R includes, for example, two brackets 44 that are located parallel or substantially parallel to each other.

The respective right ends of the front lower arm 63L and the front upper arm 64L of the front suspension 61L (see FIG. 2) are mounted to the suspension support 43L of the front frame 4B so as to be swingable up and down. The respective left ends of the front lower arm 63R and the front upper arm 64R of the front suspension 61R (see FIG. 2) are mounted to the suspension support 43R of the front frame 4B so as to be swingable up and down.

The rear frame 4C includes a pair of right and left side frame portions 44R and 44L extending rearward from the rear cross member 22B of the intermediate frame 4A, and a plate frame portion 45 extending along or substantially along the horizontal plane and between the side frame portion 44L and the side frame portion 44R. The side frame portion 44L and the side frame portion 44R are linked to each other by the plate frame portion 45. The right end of the rear lower arm 65L of the rear suspension 62L (see FIG. 2) is mounted to the side frame portion 44L of the rear frame 4C so as to be swingable up and down. The left end of the rear lower arm 65R of the rear suspension 62R (see FIG. 2) is mounted to the side frame portion 44R of the rear frame 4C so as to be swingable up and down.

The upper frame 4D includes a cross member 46, a pair of right and left supporting frame portions 47R and 47L, and cross members 48, 49, and 50, extending in the right-left direction, and is located above the rear frame 4C. The cross member 46 extends in the right-left direction and links the rear ends of the respective lateral portions 28B of the left frame 4L and the right frame 4R to each other. The supporting frame portions 47L and 47R are parallel or substantially parallel to each other, are located between the lateral portion 28B of the left frame 4L and the lateral portion 28B of the right frame 4R, and extend forward from the cross member 46. A front end portion of the supporting frame portion 47L is located above a rear end portion of the left side frame portion 21L of the intermediate frame 4A, and a front end portion of the supporting frame portion 47R is located above a rear end portion of the right side frame portion 21R. The cross members 48, 49, and 50 are aligned in that order from the front and link the supporting frame portion 47L and the supporting frame portion 47R. A left end portion of the cross member 49 projects farther leftward than the supporting frame portion 47L, and a right end portion of the cross member 49 projects farther rightward than the supporting frame portion 47R.

The left rear seat 5BL is coupled to the supporting frame portion 47L. The above-described right rear seat 5BR is coupled to the supporting frame portion 47R. The above-described rear deck 60 is coupled to and supported by the supporting frame portion 47L, the supporting frame portion 47R, cross member 49, cross member 50, etc., of the upper frame 4D. The upper ends of the above-described shock absorbers 68L and 68R are respectively coupled to the left end portion and the right end portion of the cross member 49. The above-described muffler 74A is located below the supporting frame portions 47L and 47R at the upper frame 4D.

The frame 4 may include a cross member 51L extending in the up-down direction and linking the front end portion of the supporting frame portion 47L and the rear end portion of the left side frame portion 21L. The frame 4 may include a cross member 51R extending in the up-down direction and linking the front end portion of the supporting frame portion 47R and the rear end portion of the right side frame portion 21R. The frame 4 may include a cross member 52L extending in the right-left direction and linking the front end portion of the supporting frame portion 47L and the extension frame portion 28 of the left frame 4L. The frame 4 may include a cross member 52R extending in the right-left direction and linking the front end portion of the supporting frame portion 47R and the extension frame portion 28 of the right frame 4R.

The frame 4 includes a pair of right and left front vertical frames 53 respectively extending upward from the side frame portions 44R and 44L of the rear frame 4C, and a pair of right and left rear vertical frames 54 respectively extending upward from the side frame portions 44R and 44L. The pair of front vertical frames 53 and the pair of rear vertical frames 54 are an example of a pair of vertical frames according to a preferred embodiment of the present invention. Although not visible in FIG. 4 due to being hidden behind the cross member 51L, an upper end of the left front vertical frame 53L of the pair of front vertical frames 53 is linked to the supporting frame portion 47L. An upper end of the right front vertical frame 53R is linked to the supporting frame portion 47R. The pair of rear vertical frames 54 are located farther rearward than the pair of front vertical frames 53. The upper end of the left rear vertical frame 54L of the pair of rear vertical frames 54 is linked to the supporting frame portion 47L and the upper end of the right rear vertical frame 54R is linked to the supporting frame portion 47R.

The right end of the rear upper arm 66L of the rear suspension 62L (see FIG. 2) is mounted to the front vertical frame 53L and the rear vertical frame 54L extending upward from the side frame portion 44L, so as to be swingable up and down. The left end of the rear upper arm 66R of the rear suspension 62R (see FIG. 2) is mounted to the front vertical frame 53R and the rear vertical frame 54R extending upward from the side frame portion 44R, so as to be swingable up and down.

A cross member 55 extending in the right-left direction links intermediate portions of the pair of front vertical frames 53 to each other. A cross member 56 extending in the right-left direction links intermediate portions of the pair of rear vertical frames 54 to each other. A plate member 57 located along or substantially along the horizontal plane links the cross member 55 and the cross member 56. The rear gearing 88 (see FIG. 3) coupled to the rear frame 4C is located below the plate member 57.

Figure 5:
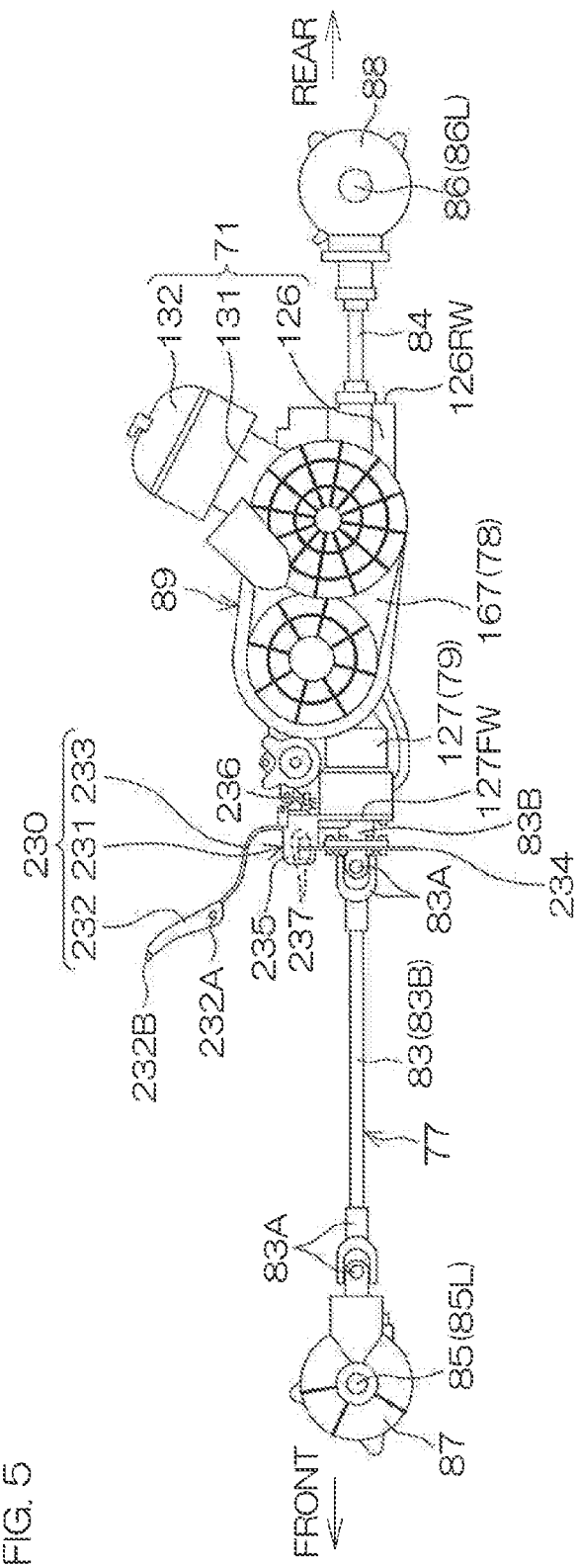
FIG. 5 is a schematic side view of a drive unit, a transmission, and a brake unit included in the vehicle.

FIG. 5 is a schematic left side view of the drive unit 89, the transmission 77, and a brake unit 230. The engine 71 of the drive unit 89 includes a crankcase 126 housing a crankshaft (not shown), a cylinder block 131 housing a piston (not shown), and a cylinder head 132 joined to an upper portion of the cylinder block 131. The continuously variable transmission 78 of the drive unit 89 includes a CVT case 167 that defines a housing of the continuously variable transmission 78. The CVT case 167 is located to the left of the crankcase 126 and is joined to the crankcase 126. The shiftable transmission 79 of the drive unit 89 includes a transmission case 127 that defines a housing of the shiftable transmission 79. The transmission case 127 is located in front of the crankcase 126 and to the right of the CVT case 167 and is joined to the crankcase 126 and the CVT case 167. A front portion of the transmission case 127 projects farther forward than a front end of the CVT case 167.

The front propeller shaft 83 of the transmission 77 extends forward and penetrates through a front wall 127FW of the transmission case 127 and is linked to the front gearing 87. The rear propeller shaft 84 of the transmission 77 extends rearward and penetrates through a rear wall 126RW of the crankcase 126 and is linked to the rear gearing 88. The front propeller shaft 83 may include a single shaft or a plurality of shafts 83B linked via joints 83A. The same also applies to the rear propeller shaft 84.

Figure 6:
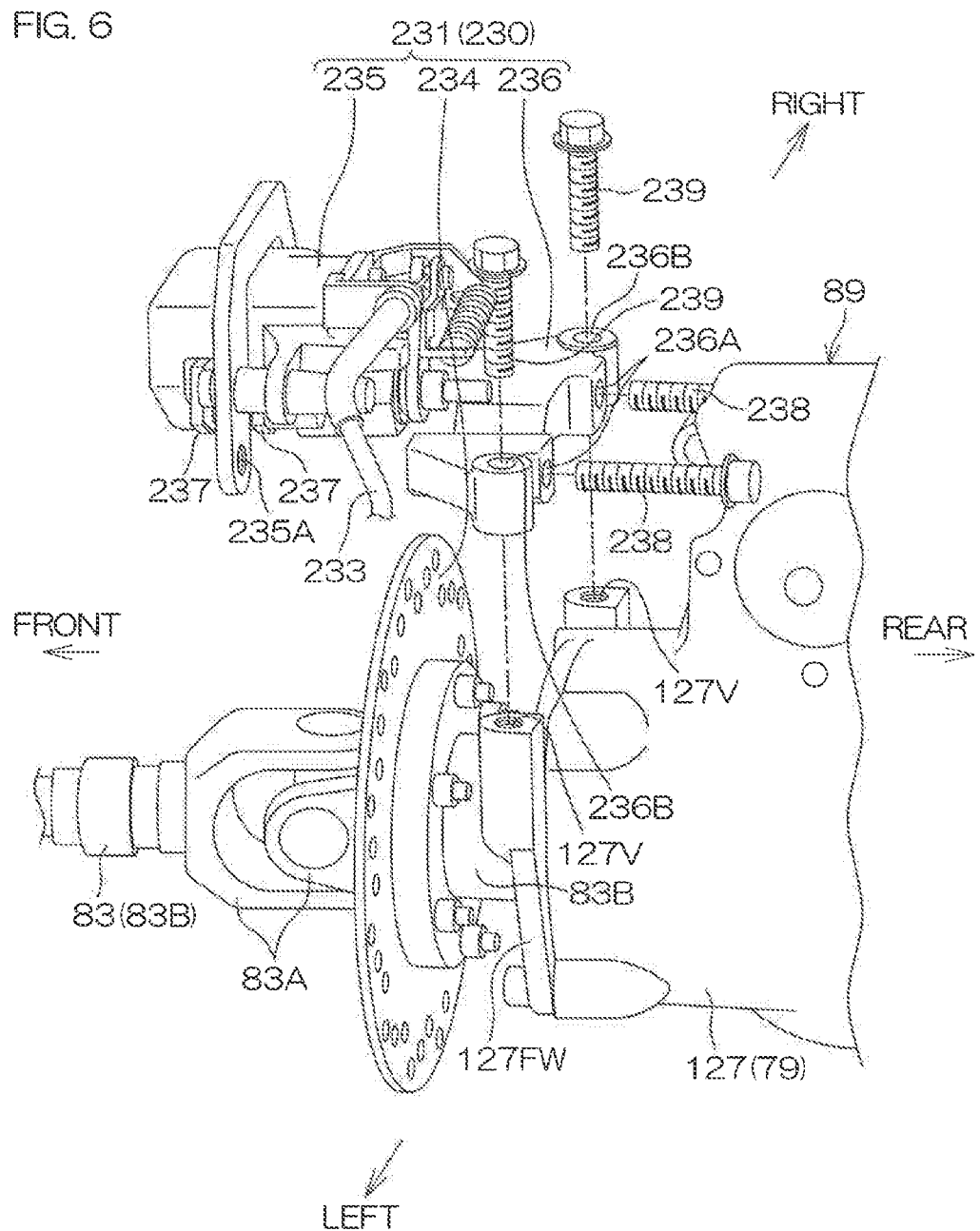
FIG. 6 is an exploded perspective view of a brake included in the brake unit.

The vehicle unit 1 further includes the brake unit 230. The brake unit 230 includes a brake 231, a brake lever 232, and a cable 233. FIG. 6 is an exploded perspective view of the brake 231. The brake 231 in the present preferred embodiment is a disk brake and includes a disk 234, a caliper 235, and a bracket 236. The disk 234 is made, for example, of a metal. The disk 234 is linked to a portion of the front propeller shaft 83 farther forward than the front wall 127FW of the transmission case 127 so as to be integrally rotatable therewith. Although the disk 234 is located adjacent to the front wall 127FW in the present preferred embodiment, the disk 234 may be spaced away from the front wall 127FW instead. The disk 234 extends annularly from an outer peripheral surface of the front propeller shaft 83.

The caliper 235 holds pads 237. For example, a pair of pads 237 are held by the caliper 235 in a state of being located to face each other across a gap. The caliper 235 is fixed to an upper portion of the front wall 127FW of the transmission case 127 via the bracket 236. Specifically, bolts 238 extending in the front-rear direction are installed in threaded holes 235A in the caliper 235 through penetrating holes 236A in the bracket 236. The caliper 235 is thus fixed to the bracket 236. Bolts 239 extending upward and downward are installed in threaded holes 127V in an upper surface of the front wall 127FW through other penetrating holes 236B in the bracket 236. The caliper 235 is thus fixed to the upper portion of the front wall 127FW. An upper portion of the disk 234 is located between the pair of pads 237 of the caliper 235 (see FIG. 5).

Figure 7:
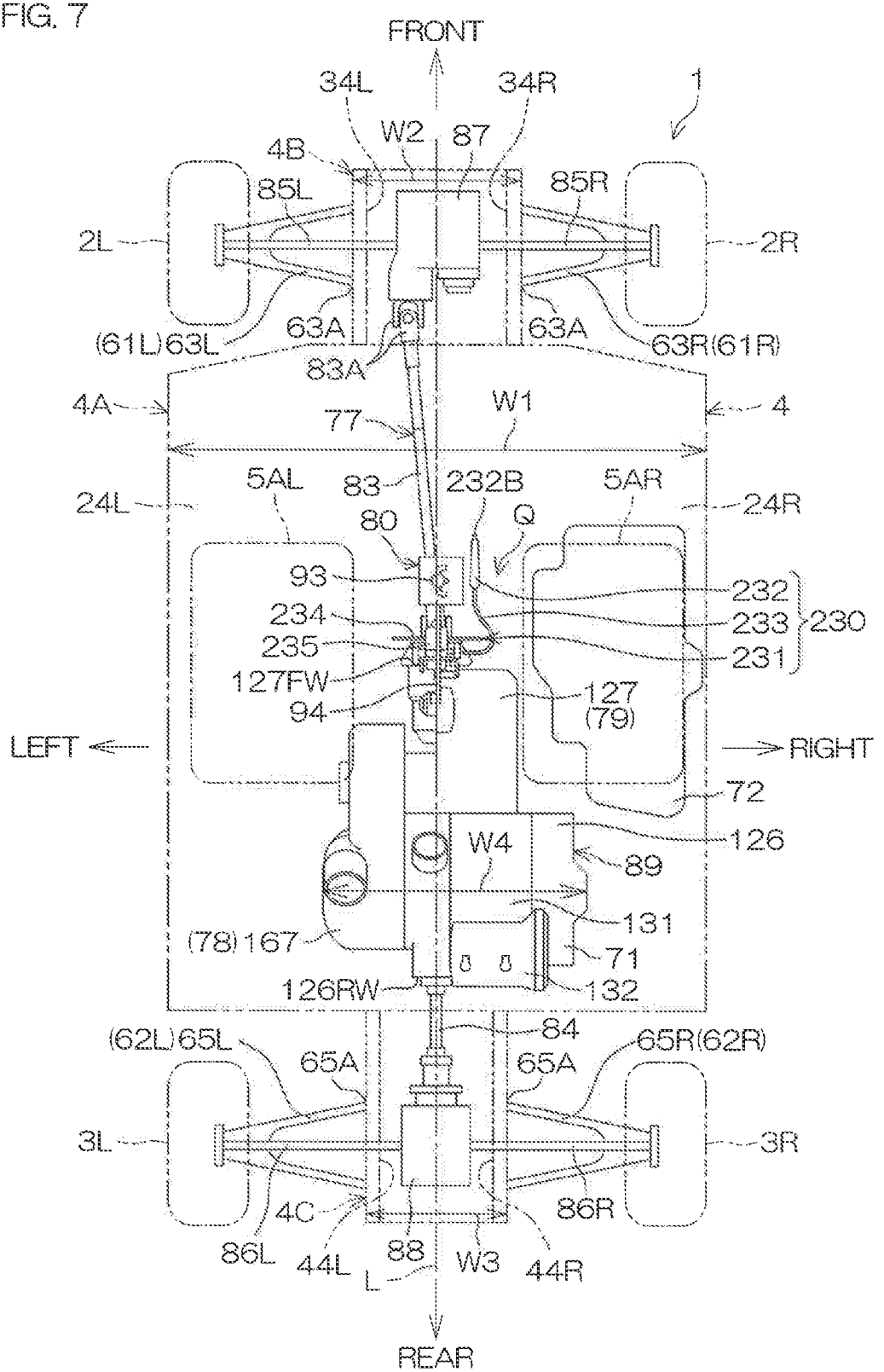
FIG. 7 is a schematic plan view of the vehicle.

FIG. 7 is a schematic plan view of the vehicle 1. The brake lever 232 is located between the pair of front seats 5A. The brake lever 232 is supported by the intermediate frame 4A via a bracket (not shown), etc. The brake lever 232 is swingable up and down around a swing shaft 232A at its rear end portion (see FIG. 5). A cable 233 connects the brake lever 232 and the caliper 235 of the brake 231. When the driver seated on the left front seat 5AL grips the brake lever 232 and pulls it upward, an operation force of the driver is input into the caliper 235 via the cable 233. The pair of pads 237 are then made to approach each other by hydraulic pressure or pneumatic pressure, etc., and clamp the upper portion of the disk 234 to generate a braking force. Rotation of the front propeller shaft 83 is thus braked. When the driver presses a release button 232B at a front end portion of the brake lever 232, the pair of pads 237 separate from each other. The braking by the brake 231 is thus released. The brake 231 in the present preferred embodiment is used as a parking brake. Brakes (not shown) that brake rotations of the vehicle wheels by pedal operation, etc., by the driver during travel of the vehicle 1 are provided separately of the brake 231. These brakes are provided respectively at the front wheels 2L and 2R and the rear wheels 3L and 3R.

The brake 231 is located outside the engine 71 in the front-rear direction and within a region defined by the intermediate frame 4A. Specifically, the brake 231 is located at an inner side of an outline of the intermediate frame 4A in plan view. The brake 231 is not required to be fixed to the intermediate frame 4A. A width W1 of the intermediate frame 4A defines a right-left distance between a right end of the right plate frame portion 24R and a left end of the left plate frame portion 24L. The lateral frame portions 25 of the right frame 4R and the left frame 4L that are respectively provided at outer sides of the right plate frame portion 24R and the left plate frame portion 24L (see FIG. 4) may be deemed to be portions of the intermediate frame 4A. In that case, the width W1 is a distance between a right end of the lateral frame portion 25 of the right frame 4R and a left end of the lateral frame portion 25 of the left frame 4L. On the other hand, a width W2 of the front frame 4B defines a right-left distance between a right end of the side frame portion 34R and a left end of the side frame portion 34L. A width W3 of the rear frame 4C defines a right-left distance between a right end of the side frame portion 44R and a left end of the side frame portion 44L. The width W1 of the intermediate frame 4A is larger than the width W2 of the front frame 4B and the width W3 of the rear frame 4C. That is, the intermediate frame 4A is wider than the front frame 4B and the rear frame 4C. The width W2 and the width W3 may be the same or may different. A width W4 of the drive unit 89 defines a right-left distance between a right end of the crankcase 126 and a left end of the CVT case 167.

The brake 231 is located between the front gearing 87 supported by the front frame 4B, and the rear gearing 88 supported by the rear frame 4C. The brake 231 is located at an upstream position closer to the engine 71 than the front gearing 87 and the rear gearing 88 which define and function as final gears. The brake 231 is located between rear ends 63A of the front lower arms 63L and 63R and front ends 65A of the rear lower arms 65L and 65R. The brake 231 is located farther forward than the drive unit 89. The brake 231 is thus located farther forward than the engine 71 and the shiftable transmission 79. The brake 231 is located at the center or substantially the center of the vehicle 1 in the right-left direction so as to overlap with the centerline L of the vehicle 1 in plan view. At least a portion of the brake 231 is located in a region Ω between the pair of front seats 5A in plan view. The brake 231 is located farther rearward than front ends of the front seats 5A.

Figure 8:
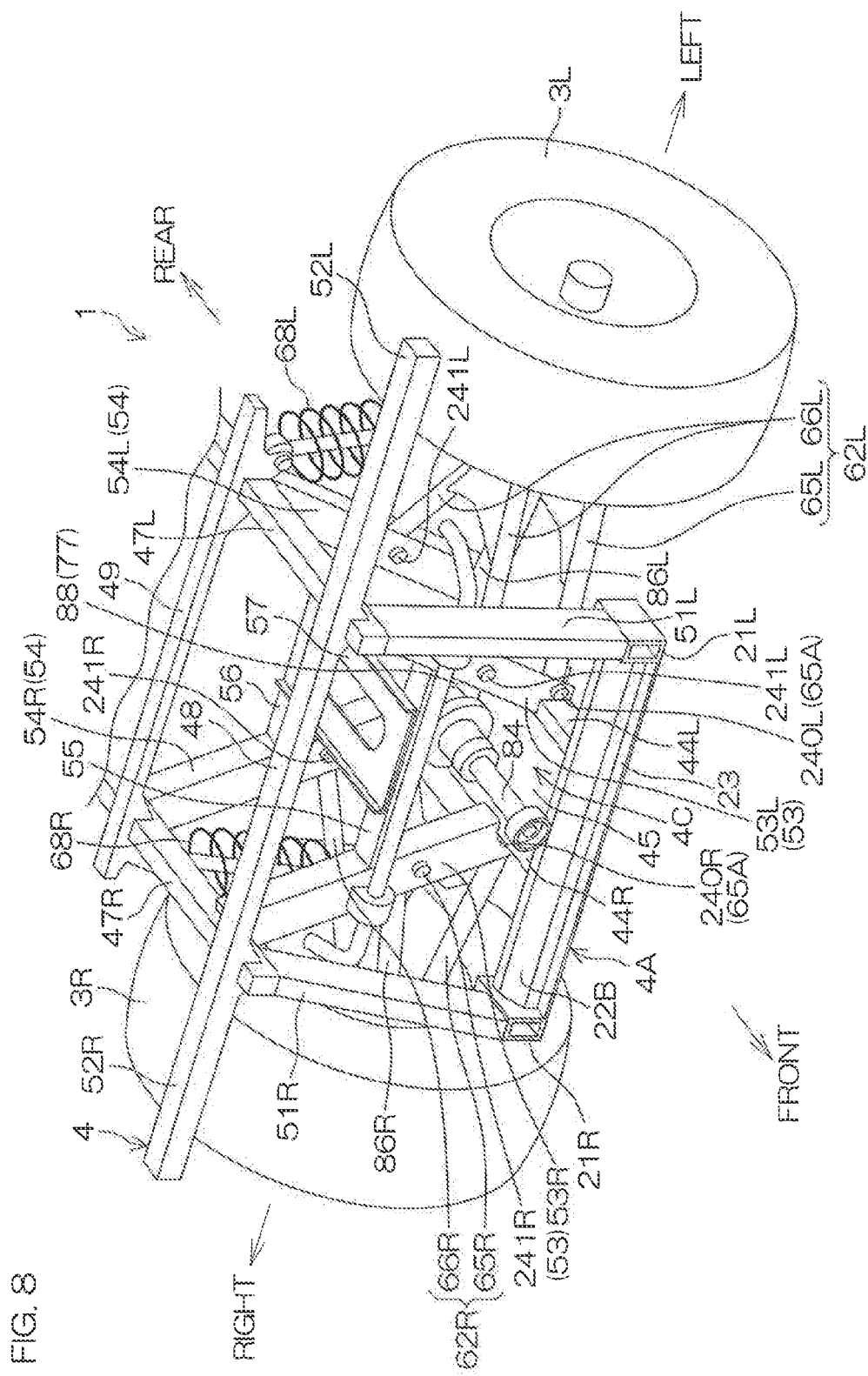
FIG. 8 is a schematic perspective view of a rear frame of the frame and a periphery thereof.

FIG. 8 is a schematic perspective view of the rear frame 4C and a periphery thereof. The pair of front vertical frames 53 extend upward to the right and left from the rear frame 4C. The pair of rear vertical frames 54 also extend upward to the right and left from the rear frame 4C. The front vertical frame 53L of the pair of front vertical frames 53 and the rear vertical frame 54L of the pair of rear vertical frames 54 overlap at least partially when viewed from the front-rear direction. The front vertical frame 53R of the pair of front vertical frames 53 and the rear vertical frame 54R of the pair of rear vertical frames 54 overlap at least partially when viewed from the front-rear direction.

Lower end portions of the front vertical frame 53L and the rear vertical frame 54L define portions of the side frame portion 44L of the rear frame 4C. Lower end portions of the front vertical frame 53R and the rear vertical frame 54R define portions of the side frame portion 44R of the rear frame 4C. A right-left width W5 between respective lower ends of the pair of front vertical frames 53 defines a right-left distance between the side frame portion 44R and the side frame portion 44L (see FIG. 9 to be described below). In the present preferred embodiment, the width W5 is also a right-left distance between respective lower ends of the pair of rear vertical frames 54.

Upper end portions of the front vertical frame 53L and the rear vertical frame 54L define portions of the side frame portion 47L of the upper frame 4D. Upper end portions of the front vertical frame 53R and the rear vertical frame 54R define portions of the side frame portion 47R of the upper frame 4D. A right-left width W6 between respective upper ends of the pair of front vertical frames 53 defines a right-left distance between the side frame portion 47R and the side frame portion 47L (see FIG. 9). In the present preferred embodiment, the width W6 is also a right-left distance between respective upper ends of the pair of rear vertical frames 54. The width W5 is preferably not more than about one-third of the width W6, for example. The width W6 is preferably as wide as possible because the laterally long rear deck 60 (see FIG. 2) is linked to the upper end portions of the front vertical frames 53 and the rear vertical frames 54.

The front vertical frame 53L and the rear vertical frame 54L include leftward facing U-shaped or substantially U-shaped planar cross sections. The right end of the rear lower arm 65L is inserted in the lower end portions of the front vertical frame 53L and the rear vertical frame 54L. The right end of the rear lower arm 65L is mounted to the lower end portions of the front vertical frame 53L and the rear vertical frame 54L so as to be swingable up and down via a swing shaft 240L extending in the front-rear direction. A front end surface of the swing shaft 240L exposed from the front vertical frame 53L may be deemed to be the front end 65A of the rear lower arm 65L. The right end of the rear upper arm 66L is inserted in the intermediate portions of the front vertical frame 53L and the rear vertical frame 54L. The right end of the rear upper arm 66L is mounted to the intermediate portions of the front vertical frame 53L and the rear vertical frame 54L so as to be swingable up and down via a swing shaft 241L extending in the front-rear direction.

The front vertical frame 53R and the rear vertical frame 54R include rightward facing U-shaped or substantially U-shaped planar cross sections. The left end of the rear lower arm 65R is inserted in the lower end portions of the front vertical frame 53R and the rear vertical frame 54R. The left end of the rear lower arm 65R is mounted to the lower end portions of the front vertical frame 53R and the rear vertical frame 54R so as to be swingable up and down via a swing shaft 240R extending in the front-rear direction. A front end surface of the swing shaft 240R exposed from the front vertical frame 53R may be deemed to be the front end 65A of the rear lower arm 65R. The left end of the rear upper arm 66R is inserted in the intermediate portions of the front vertical frame 53R and the rear vertical frame 54R. The left end of the rear upper arm 66R is mounted to the intermediate portions of the front vertical frame 53R and the rear vertical frame 54R so as to be swingable up and down via a swing shaft 241R extending in the front-rear direction.

Figure 9:
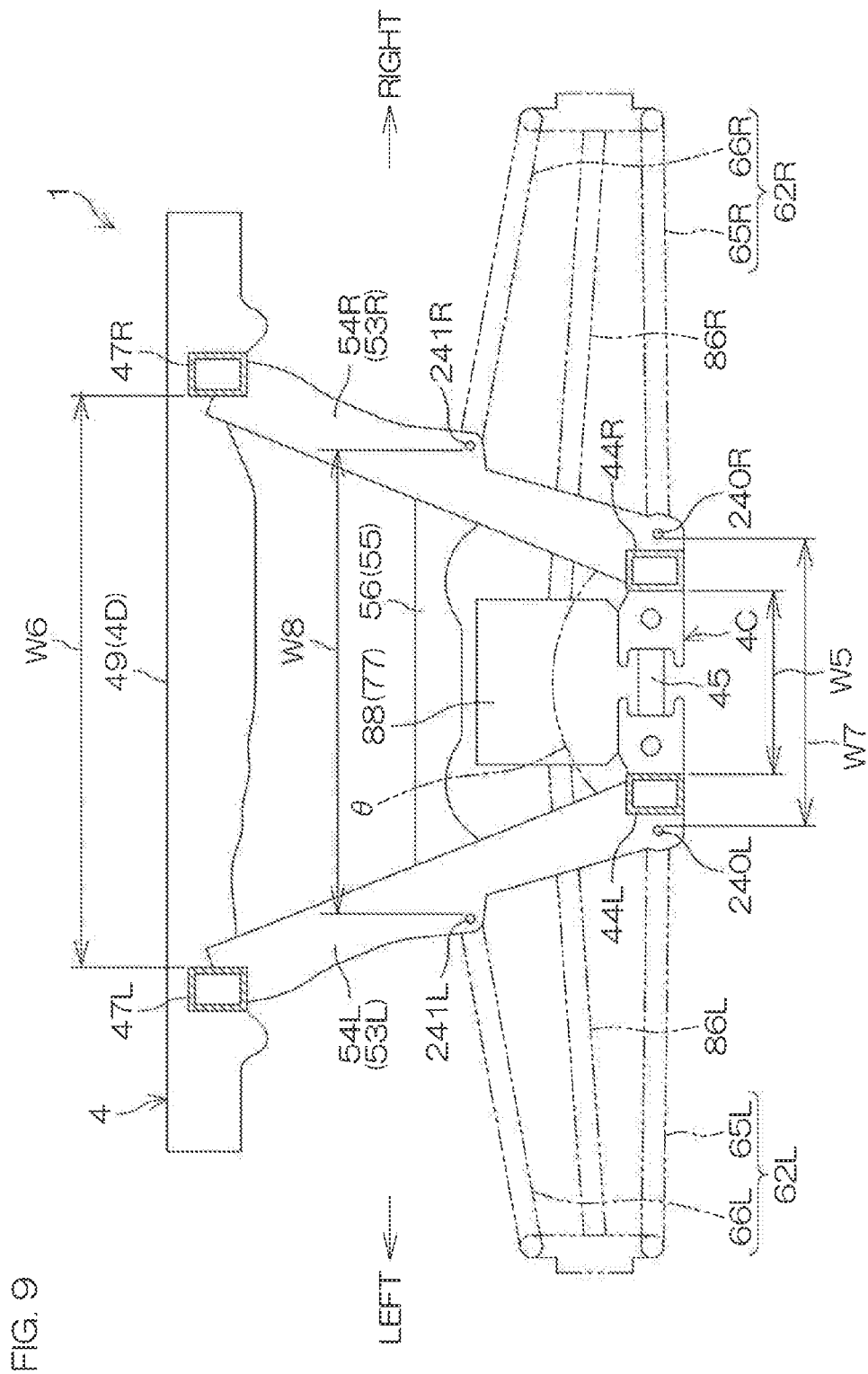
FIG. 9 is a schematic rear view of the rear frame and the periphery thereof.

FIG. 9 is a schematic rear view of the rear frame 4C and the periphery thereof. A mounting width W7 of the pair of rear lower arms 65R and 65L at the rear frame 4C defines a right-left distance between the swing shaft 240R and the swing shaft 240L. A mounting width W8 of the pair of rear upper arms 66R and 66L at the rear vertical frames 54 defines a right-left distance between the swing shaft 241R and the swing shaft 241L. The mounting width W8 also defines a mounting width of the pair of rear upper arms 66R and 66L at the pair of front vertical frames 53. The mounting width W7 is narrower than the mounting width W8 and the width W4 (see FIG. 7) of the drive unit 89. The width W4 and the mounting width W8 may be the same. The mounting width W8 may be wider than or may be narrower than the width W4. The width W5 between the respective lower ends of the pair of front vertical frames 53, the mounting width W7, the mounting width W8, and the width W6 between the respective upper ends of the pair of front vertical frames 53 increase in distance in that order.

As described above, with the structural arrangement according to a preferred embodiment of the present invention, the brake 231 that is located outside the engine 71 in the front-rear direction is located within the region defined by the intermediate frame 4A. An installation space for the brake 231 is thus not required to be provided in the front frame 4B or the rear frame 4C. It is thus unnecessary to widen the widths of the front frame 4B and the rear frame 4C to avoid interference with the brake 231. The width W2 of the front frame 4B and the width W3 of the rear frame 4C (particularly the distance between the pair of front vertical frames 53 and the distance between the pair of rear vertical frames 54) are thus able to be narrow. Making the vehicle 1 compact at the front frame 4B and the rear frame 4C is thus enabled. Further, the front lower arms 63R and 63L which are mounted to the front frame 4B and support the front wheels 2, and the rear lower arms 65R and 65L which are mounted to the rear frame 4C and support the rear wheels 3 are able to be long in the right-left direction. That is, by disposing the brake 231 at a position that would not affect the front lower arms 63R and 63L and the rear lower arms 65R and 65L, securing sufficient lengths of the front lower arms 63R and 63L and the rear lower arms 65R and 65L is enabled while making the vehicle 1 compact.

According to a preferred embodiment of the present invention, the brake 231 is located between the front gearing 87 supported by the front frame 4B, and the rear gearing 88 supported by the rear frame 4C. The installation space for the brake 231 is thus not required to be provided in the front frame 4B or the rear frame 4C. The width W2 of the front frame 4B and the width W3 of the rear frame 4C are thus able to be narrow. The front lower arms 63R and 63L and the rear lower arms 65R and 65L are thus able to be long in the right-left direction while making the vehicle 1 compact at the front frame 4B and the rear frame 4C.

According to a preferred embodiment of the present invention, the brake 231 is located between the rear ends 63A of the front lower arms 63R and 63L mounted to the front frame 4B, and the front ends 65A of the rear lower arms 65R and 65L mounted to the rear frame 4C. In accordance with this preferred embodiment, the installation space for the brake 231 is not required to be provided in the front frame 4B or the rear frame 4C. The width W2 of the front frame 4B and the width W3 of the rear frame 4C are thus able to be narrow. The front lower arms 63R and 63L and the rear lower arms 65R and 65L are thus able to be long in the right-left direction while making the vehicle 1 compact at the front frame 4B and the rear frame 4C.

According to a preferred embodiment of the present invention, the brake 231 is located farther forward than the engine 71. In accordance with this preferred embodiment, the brake 231 is able to be located in proximity to the engine 71 that is supported by the intermediate frame 4A. The installation space for the brake 231 is thus not required to be provided in the front frame 4B or the rear frame 4C. The width W2 of the front frame 4B and the width W3 of the rear frame 4C are thus able to be narrow. The front lower arms 63R and 63L and the rear lower arms 65R and 65L are thus able to long in the right-left direction while making the vehicle 1 compact at the front frame 4B and the rear frame 4C.

According to a preferred embodiment of the present invention, the intermediate frame 4A is wider than the front frame 4B and the rear frame 4C. In accordance with this preferred embodiment, the installation space for the brake 231 is able to be secured in the wide intermediate frame 4A. The installation space is thus not required to be provided in the front frame 4B or the rear frame 4C. The width W2 of the front frame 4B and the width W3 of the rear frame 4C are thus able to be narrow. The front lower arms 63R and 63L and the rear lower arms 65R and 65L are thus able to be long in the right-left direction while making the vehicle 1 compact at the front frame 4B and the rear frame 4C.

According to a preferred embodiment of the present invention, the brake 231 is the parking brake including the disk 234 integrally rotatably linked to the front propeller shaft 83, and the caliper 235 holding the pads 237 that clamp the disk 234 to generate the braking force. In accordance with this preferred embodiment, the installation space for the parking brake including the bulky disk 234 is not required to be provided in the front frame 4B or the rear frame 4C. The width W2 of the front frame 4B and the width W3 of the rear frame 4C are thus able to be narrow. The front lower arms 63R and 63L and the rear lower arms 65R and 65L are thus able to be long in the right-left direction while making the vehicle 1 compact at the front frame 4B and the rear frame 4C.

According to a preferred embodiment of the present invention, the brake 231 is located farther forward than the drive unit 89 defined by the engine 71, supported by the intermediate frame 4A, and the shiftable transmission 79. The installation space for the brake 231 is thus not required to be provided in the rear frame 4C. The width W3 of the rear frame 4C is thus able to be narrow. The rear lower arms 65R and 65L are thus able to be long in the right-left direction while making the vehicle 1 compact at the rear frame 4C.

According to a preferred embodiment of the present invention, the brake 231 is located farther forward than the shiftable transmission 79, which is farther forward than the engine 71, which is supported by the intermediate frame 4A. The installation space for the brake 231 is thus not required to be provided in the rear frame 4C. The width W3 of the rear frame 4C is thus able to be narrow. The rear lower arms 65L and 65R are thus able to be long while making the vehicle 1 compact at the rear frame 4C.

According to a preferred embodiment of the present invention, the caliper 235 is fixed to the drive unit 89. In accordance with this preferred embodiment, the brake 231 is able to be located in proximity to the engine 71 which is an element of the drive unit 89 and is supported by the intermediate frame 4A. The installation space for the brake 231 is thus easily secured in the region defined by the intermediate frame 4A. The installation space is thus not required to be provided in the rear frame 4C. The width W3 of the rear frame 4C is thus able to be narrow. The rear lower arms 65L and 65R are thus able to be long while making the vehicle 1 compact at the rear frame 4C.

According to a preferred embodiment of the present invention, the mounting width W7 of the pair of rear lower arms 65L and 65R at the rear frame 4C is narrower than the width W4 of the drive unit 89. The rear lower arms 65L and 65R are thus able to be long while making the vehicle 1 compact at the rear frame 4C.

According to a preferred embodiment of the present invention, the brake 231 is located at the center or substantially the center of the vehicle 1 in the right-left direction. In accordance with this preferred embodiment, due to the brake 231, which is a heavy object, being located at the center or substantially the center of the vehicle 1 in the right-left direction, a center of gravity of the vehicle 1 is able to be close to the center of the vehicle in the right-left direction, thus providing an improved motion performance of the vehicle 1.

According to a preferred embodiment of the present invention, at least a portion of the brake 231 is located in the region Q between a pair of seats 5 in plan view. In accordance with this preferred embodiment, the brake 231 is able to be located at the center or substantially the center of the vehicle 1 in the right-left direction, thus enabling the center of gravity of the vehicle 1 to be close to the center of the vehicle in the right-left direction and improving motion performance of the vehicle 1.

According to a preferred embodiment of the present invention, the front lower arms 63L and 63R and the rear lower arms 65L and 65R are A-arms. The lengths of the A-arms strongly influence the motion performance of the vehicle 1. As mentioned above, the brake 231 is located in the region defined by the intermediate frame 4A in the front-rear direction, and thus the widths of the front frame 4B and the rear frame 4C are able to be small. Securing sufficient lengths of the A-arms mounted to the front frame 4B and the rear frame 4C is thus enabled while making the vehicle 1 compact at the front frame 4B and the rear frame 4C.

According to a preferred embodiment of the present invention, the width W5 between the respective lower ends of the pair of front vertical frames 53 is not more than about one-third of the width W6 between the respective upper ends of the pair of front vertical frames 53. In accordance with this preferred embodiment, due to the width W5 being not more than about one-third of the width W6, the width W7 between the mounting positions of the right and left rear lower arms 65R and 65L is small. Accordingly, the rear lower arms 65R and 65L are able to be long while making the vehicle 1 compact at the rear frame 4C.

Although preferred embodiments of the present invention have been described above, the present invention is not restricted to the contents of these preferred embodiments and various modifications are possible within the scope of the present invention.

The brake 231 may be located farther rearward than the engine 71. In this case, the caliper 235 is fixed to a rear wall 126RW of the crankcase 126. The disk 234 is integrally rotatably linked to a portion of the rear propeller shaft 84 farther rearward than the rear wall 126RW. The disk 234 is located so as not to protrude to the rear from the outline of the intermediate frame 4A in plan view. The brake 231 brakes the rotation of the rear propeller shaft 84.

The brake 231 may be used not just as the parking brake for parking, but also used as a brake for deceleration of the vehicle 1 during traveling.

The brake 231 is not restricted to the disk brake and may instead be a brake of another structure, such as a so-called wet disk brake or drum brake, etc.

Although two seats 5 are preferably aligned in the right-left direction, three or more seats 5 may be aligned in the right-left direction.

The vehicle 1 preferably includes the pair of front wheels 2L and 2R and the pair of rear wheels 3L and 3R. However, a vehicle according to a preferred embodiment of the present invention may include two or more pairs of front wheels 2 and may include two or more pairs of rear wheels 3.

Although the vehicle 1 is preferably a recreational off-road vehicle, the vehicle according to a preferred embodiment of the present invention may be a utility vehicle of any category. A general utility vehicle includes a frame structure and vehicle wheels suited for off-road travel.

Also, features of two or more of the various preferred embodiments described above may be combined.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
at least one seat located such that a plurality of occupants are able to be seated in a right-left direction of the vehicle;
an engine;
a front frame including a pair of right and left front arms swingably mounted thereto and respectively supporting right and left front wheels;
a rear frame including a pair of right and left rear arms swingably mounted thereto and respectively supporting right and left rear wheels;
an intermediate frame located between the front frame and the rear frame in a front-rear direction of the vehicle and supporting the at least one seat and the engine;
a front propeller shaft extending forward from the engine to transmit a rotational power of the engine to the front wheels;
a rear propeller shaft extending rearward from the engine to transmit the rotational power of the engine to the rear wheels; and
a brake located outside the engine in the front-rear direction and within a region defined by the intermediate frame to brake a rotation of the front propeller shaft or the rear propeller shaft; wherein
the brake is located farther forward than the engine and farther rearward than a front end of the at least one seat.

2. The vehicle according to claim 1, further comprising:
a front drive shaft extending in the right-left direction and linked to the front wheels;
a rear drive shaft extending in the right-left direction and linked to the rear wheels;
a front gearing supported by the front frame and linking the front propeller shaft and the front drive shaft; and
a rear gearing supported by the rear frame and linking the rear propeller shaft and the rear drive shaft; wherein
the brake is located between the front gearing and the rear gearing.

3. The vehicle according to claim 1, wherein the brake is located between rear ends of the pair of front arms and front ends of the pair of rear arms.

4. The vehicle according to claim 1, wherein the intermediate frame is wider than the front frame and the rear frame.

5. The vehicle according to claim 1, wherein the brake is a parking brake including a disk integrally rotatably linked to the front propeller shaft, and a caliper holding a pad that clamps the disk to generate a braking force.

6. The vehicle according to claim 5, further comprising:
a shiftable transmission that shifts and transmits the rotational power from the engine to the front propeller shaft and the rear propeller shaft and that is integral with the engine to define a drive unit; wherein
the brake is located farther forward than the drive unit.

7. The vehicle according to claim 6, wherein the shiftable transmission is located farther forward than the engine and the brake is located farther forward than the shiftable transmission.

8. The vehicle according to claim 6, wherein the caliper is fixed to the drive unit.

9. The vehicle according to claim 6, wherein
the drive unit further includes a continuously variable transmission integral with the engine and the shiftable transmission and that transmits the rotational power from the engine to the shiftable transmission; wherein
a mounting width of the pair of rear arms at the rear frame is narrower than a width of the drive unit.

10. The vehicle according to claim 1, wherein the brake is located at a center or substantially a center of the vehicle in the right-left direction.

11. The vehicle according to claim 1, wherein the at least one seat includes a pair of seats aligned in the right-left direction; and
at least a portion of the brake is located in a region between the pair of seats in a plan view of the vehicle.

12. The vehicle according to claim 1, wherein the pair of front arms and the pair of rear arms are A-arms.

13. The vehicle according to claim 1, further comprising:
a pair of vertical frames extending upward and rightward and leftward from portions of the rear frame at which the pair of rear arms are mounted; and
an upper frame located at a position higher than the rear frame, linked to upper ends of the pair of vertical frames, and supporting a rear deck; wherein
a distance between lower ends of the pair of vertical frames is not more than one-third of a distance between the upper ends of the pair of vertical frames.

* * * * *